US012537292B2

(12) United States Patent
Emerick

(10) Patent No.: US 12,537,292 B2
(45) Date of Patent: Jan. 27, 2026

(54) MULTI-BAND LOW PROFILE ANTENNA AND VEHICLE-MOUNTED ANTENNA

(71) Applicant: PULSE ELECTRONICS, INC., San Diego, CA (US)

(72) Inventor: Curtis Emerick, Ridgefield, WA (US)

(73) Assignee: PULSE ELECTRONICS, INC., San Diego, CA (US)

(*) Notice: Subject to any disclaimer, the term of this patent is extended or adjusted under 35 U.S.C. 154(b) by 160 days.

(21) Appl. No.: 18/512,707

(22) Filed: Nov. 17, 2023

(65) Prior Publication Data

US 2025/0167435 A1 May 22, 2025

(51) Int. Cl.
*H01Q 1/32* (2006.01)
*H01Q 1/48* (2006.01)
*H01Q 21/28* (2006.01)

(52) U.S. Cl.
CPC ............. *H01Q 1/3275* (2013.01); *H01Q 1/48* (2013.01); *H01Q 21/28* (2013.01)

(58) Field of Classification Search
None
See application file for complete search history.

(56) References Cited

U.S. PATENT DOCUMENTS 5,402,134 A * 3/1995 Miller ...................... H01Q 5/40 343/745
2019/0267697 A1* 8/2019 Quinlan .................. H01Q 1/36
2020/0091608 A1* 3/2020 Alpman .................. H03L 7/145

FOREIGN PATENT DOCUMENTS

JP 2008271551 A * 11/2008 ............... H01Q 5/00

* cited by examiner

*Primary Examiner* — Crystal L Hammond
(74) *Attorney, Agent, or Firm* — MUNCY, GEISSLER, OLDS & LOWE, P.C.

(57) ABSTRACT

A multi-band low profile antenna and a vehicle-mounted antenna are provided. The multi-band low profile antenna includes a base board, a circuit board vertically disposed on the base board, a first antenna circuit disposed on the circuit board, a second antenna circuit disposed on the circuit board, a third antenna circuit disposed on the circuit board, a connection cable disposed between the first antenna circuit and the second antenna circuit, and a main cable electrically connected to the first terminal of the connection cable. For the vehicle-mounted antenna includes the multi-band low profile antenna, the base board has an opening, and the main cable has a first part passing through the opening of the base board, and a second part extending against a top surface of the base board, and the base board is adaptive for a roof of a vehicle.

18 Claims, 5 Drawing Sheets first side of the multi-band low profile antenna

MULTI-BAND LOW PROFILE ANTENNA AND VEHICLE-MOUNTED ANTENNA

BACKGROUND

Field of Invention

The present invention relates to a multi-band low profile antenna and a vehicle-mounted antenna.

Description of Related Art

Antennas are commonly used in variable electronics, such as notebooks, smart phones, personal digital assistants (PDAs) or other wireless communication devices. Typically, the antennas may be designed to be corresponding to one or more frequency bands to meet user's demands.

In order to meet a demand for multi-band communication, the antenna device is designed to integrate antenna circuits corresponding to different frequency bands. However, the integration of the antenna circuits results in a large size of the antenna device.

SUMMARY

Embodiments of the present invention provide a multi-band low profile antenna and a vehicle-mounted antenna. In the multi-band low profile antenna, one connection cable is used to integrate antenna circuits corresponding to different frequency bands for size reduction.

In accordance with an embodiment of the invention, the multi-band low profile antenna includes a base board, a circuit board, a first antenna circuit, a second antenna circuit, a third antenna circuit, a connection cable and a main cable. The circuit board is vertically disposed on a top surface of the base board. The first antenna circuit is disposed on the circuit board. The first antenna circuit is configured to provide a first communication function of a first frequency band. The second antenna circuit is disposed on the circuit board. The second antenna circuit is configured to provide a second communication function of a second frequency band. The third antenna circuit is disposed on the circuit board. The third antenna circuit is configured to provide a third communication function of a third frequency band. The third antenna circuit is configured to provide a third communication function of a third frequency band.

The connection cable is disposed between the first antenna circuit and the second antenna circuit. The connection cable has a first terminal electrically connected to the first antenna circuit, and has a second terminal electrically connected to the second antenna circuit and the third antenna circuit, thereby transmitting the signals of the first antenna circuit, the second antenna circuit and the third antenna circuit. The main cable is electrically connected to the first terminal of the connection cable to transmit the signals of the first antenna circuit, the second antenna circuit and the third antenna circuit to or from an external device. A length of the connection cable is controlled in accordance with the first frequency band, the second band and the third frequency band.

In some embodiments, the first frequency band of the first antenna circuit corresponds to a Very High Frequency (VHF) band, the second frequency band of the second antenna circuit corresponds to a frequency band from 700 MHz to 800 MHZ, and the third frequency band of the third antenna circuit corresponds to an Ultra-High Frequency (UHF) band.

In some embodiments, the circuit board has a first side and a second side opposite to the first side, a part of the main cable is disposed at the first side of the circuit board, and the connection cable is disposed at the second side of the circuit board.

In some embodiments, the first terminal of the connection cable is electrically connected to a first connection point to be electrically connected to the first antenna circuit at the second side of the circuit board, and the part of the main cable passes through the circuit board to be electrically connected to the first connection point at the second side of the circuit board for electric connection to the connection cable.

In some embodiments, the second terminal of the connection cable is electrically connected to a second connection point at the second side of the circuit board for electric connection to the second antenna circuit.

In some embodiments, the first antenna circuit includes a first radiator disposed on a top of the circuit board, the second antenna circuit has a second radiator disposed at a first edge of the circuit board, and the third antenna circuit has a third radiator disposed between the first radiator and the second radiator.

In some embodiments, the first antenna circuit further includes a top loading element disposed on the top of the circuit board.

In some embodiments, the circuit board has an opening at a second edge opposite to the first edge, and the first antenna circuit further includes a metal element disposed in the opening of the circuit board.

In some embodiments, the base board has a ground plane for optimization of the Voltage Standing Wave Ratio (VSWR) of the multi-band low profile antenna.

In some embodiments, the main cable and the connection cable are coaxial cables.

In accordance with an embodiment of the invention, the vehicle-mounted antenna includes a base board, a circuit board, a second antenna circuit, a third antenna circuit, a connection cable and a main cable. The circuit board is vertically disposed on a top surface of the base board. The first antenna circuit is disposed on the circuit board. The first antenna circuit is designed for a first frequency band. The second antenna circuit is disposed on the circuit board. The second antenna circuit is designed for a second frequency band. The third antenna circuit is disposed on the circuit board. The third antenna circuit is designed for a third frequency band. The connection cable is disposed between the first antenna circuit and the second antenna circuit. The connection cable has a first terminal electrically connected to the first antenna circuit, and has a second terminal electrically connected to the second antenna circuit and the third antenna circuit, thereby transmitting the signals of the first antenna circuit, the second antenna circuit and the third antenna circuit. The main cable is electrically connected to the first terminal of the connection cable to transmit signals of the first antenna circuit, the second antenna circuit and the third antenna circuit to or from an external device. A length of the connection cable is controlled in accordance with the first frequency band, the second band and the third frequency band. The base board has an opening, the main cable has a first part passing through the opening of the base board, and a second part extending against a top surface of the base board, and the base board is adaptive for a roof of a vehicle.

In some embodiments, the first frequency band of the first antenna circuit corresponds to a VHF band, the second frequency band of the second antenna circuit corresponds to a frequency band from 700 MHz to 800 MHZ, and the third frequency band of the third antenna circuit corresponds to an UHF band.

In some embodiments, the circuit board has a first side and a second side opposite to the first side, the second part of the main cable is disposed at the first side of the circuit board, and the connection cable is disposed at the second side of the circuit board.

In some embodiments, the first terminal of the connection cable is electrically connected to a first connection point to be electrically connected to the first antenna circuit at the second side of the circuit board, and the second part of the main cable passes through the circuit board to be electrically connected to the first connection point at the second side of the circuit board for electric connection to the connection cable.

In some embodiments, the second terminal of the connection cable is electrically connected to a second connection point at the second side of the circuit board for electric connection to the second antenna circuit.

In some embodiments, the first antenna circuit includes a first radiator disposed on a top of the circuit board, the second antenna circuit has a second radiator disposed at a first edge of the circuit board, and the third antenna circuit has a third radiator disposed between the first radiator and the second radiator.

In some embodiments, the first antenna circuit further includes a top loading element disposed on the top of the circuit board.

In some embodiments, the circuit board has an opening at a second edge opposite to the first edge, and the first antenna circuit further includes a metal element disposed in the opening the main cable and the connection cable are coaxial cables.

In some embodiments, the base board has a ground plane for optimization of the VSWR of the multi-band low profile antenna.

In some embodiments, the main cable and the connection cable are coaxial cables.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology but are not referred to particular order or sequence.

Figure 1:
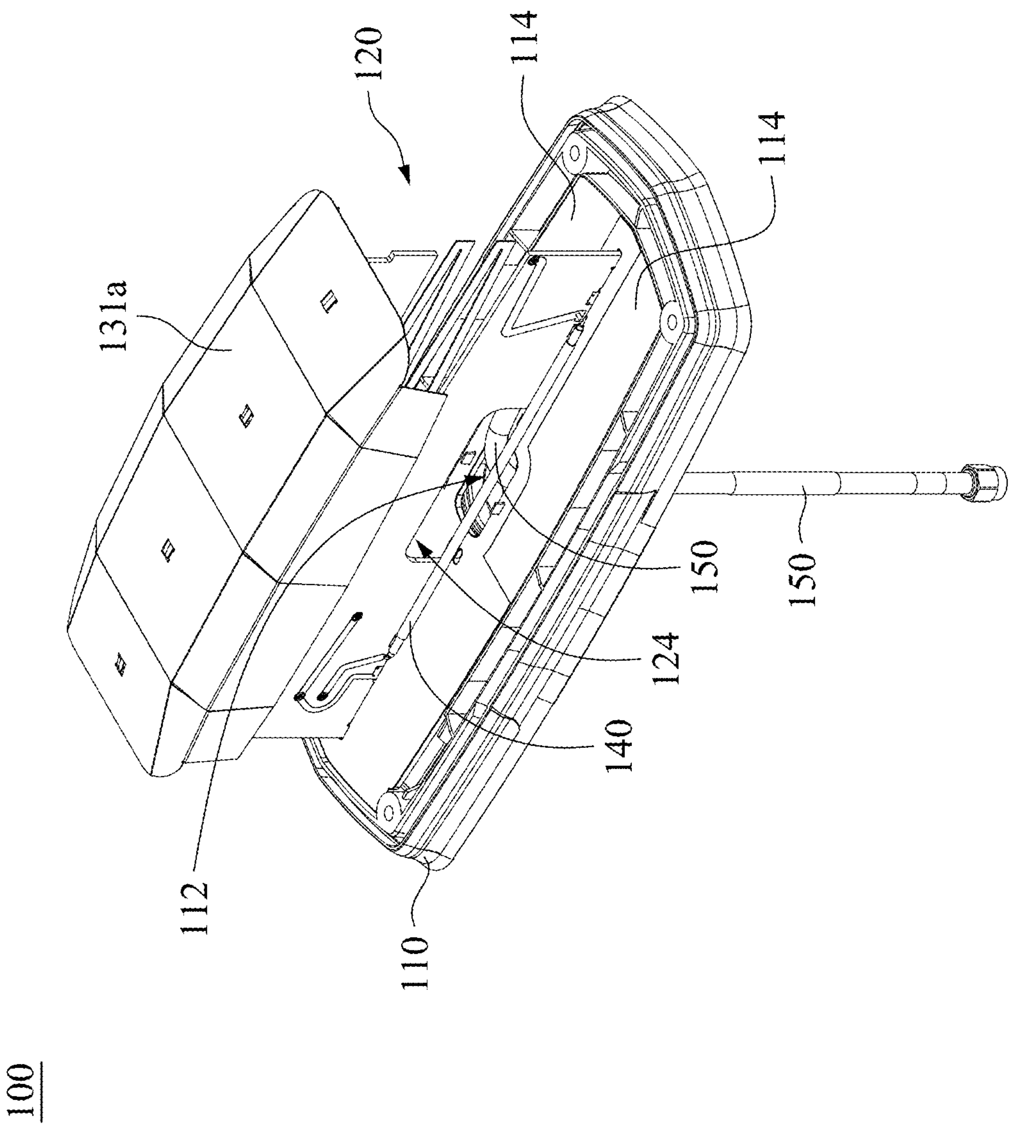
FIG. 1 is a schematic diagram showing a perspective view of a multi-band low profile antenna in accordance with an embodiment of the present invention.
Figure 2:
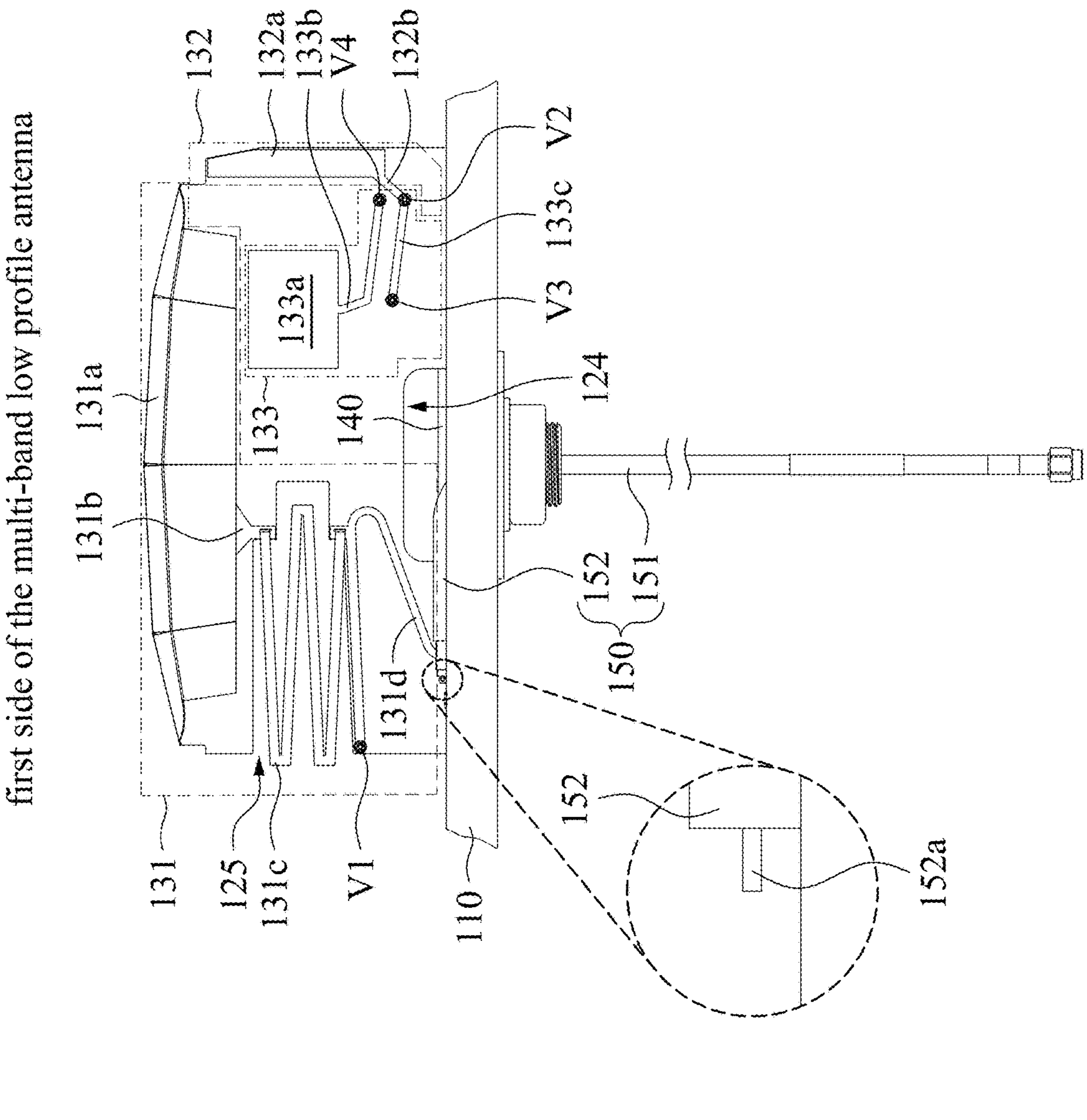
FIG. 2 is a schematic diagram showing a first side of the multi-band low profile antenna.
Figure 3:
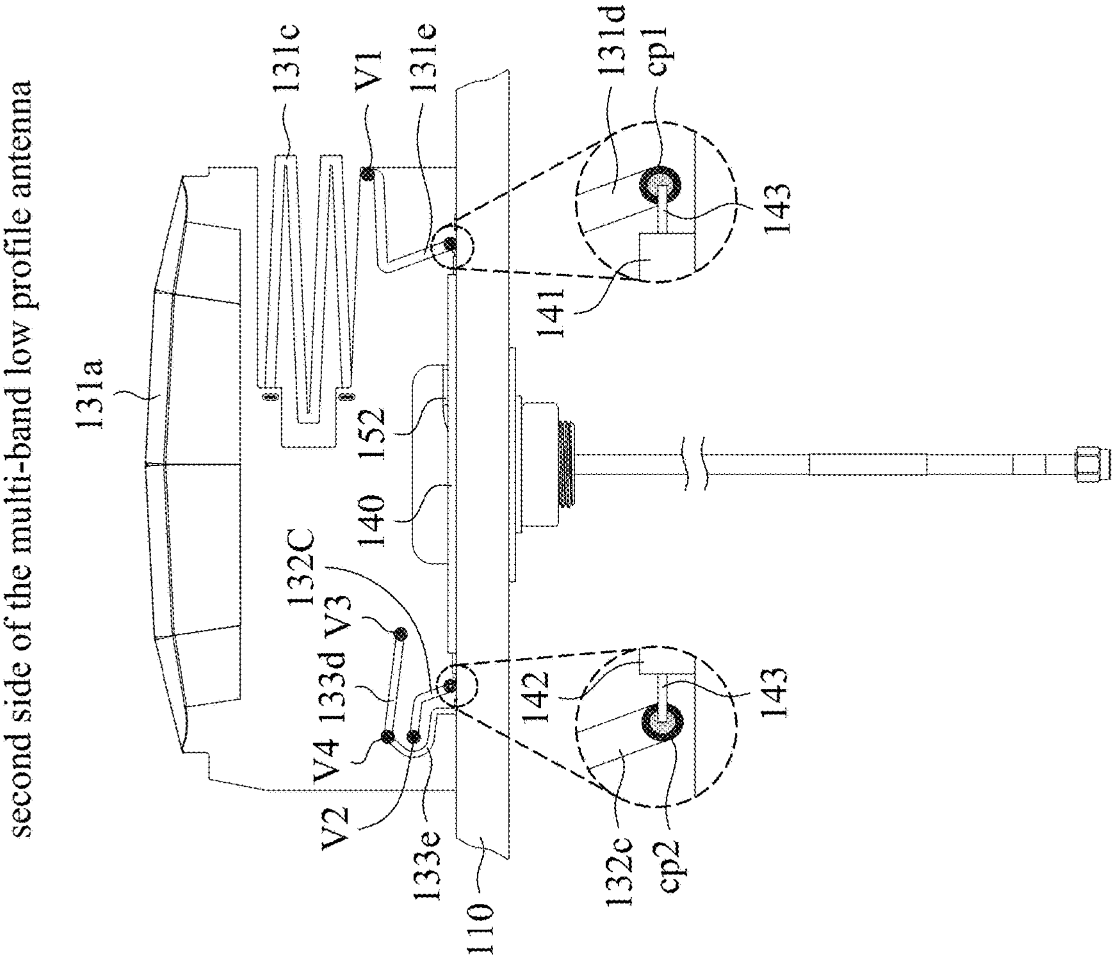
FIGS. 3-4 are schematic diagrams showing a second side of the multi-band low profile antenna.

Referring to FIG. 1, FIG. 2 and FIG. 3, FIG. 1 is a schematic diagram showing a perspective view of a multi-band low profile antenna 100 in accordance with an embodiment of the present invention, FIG. 2 is a schematic diagram showing a first side of the multi-band low profile antenna 100, and FIG. 3 is a schematic diagram showing a second side of the multi-band low profile antenna 100, in which the second side is opposite to the first side. The multi-band low profile antenna 100 includes a base board 110, a circuit board 120 disposed on the base board 110, plural antenna circuits 131-133 disposed on the circuit board 120, a connection cable 140 disposed on the base board 110 and a main cable 150 disposed on the base board 110 for transmitting antenna signals of the antenna circuits 131-133. The antenna circuits 131-133 provide wireless communication functions corresponding to different frequency bands. In this embodiment, the frequency bands include a very high frequency (VHF) band, an ultra-high frequency (UHF) band and a frequency band from 700 MHz to 800 MHz, but embodiments of the present invention are not limited thereto.

The multi-band low profile antenna 100 may further include a housing (not shown) disposed on the base board 110 and covering the base board 110, the circuit board 120, the antenna circuits 131-133 and the connection cable 140 to protect the components of the multi-band low profile antenna 100.

In some embodiments, the multi-band low profile antenna 100 is designed as a vehicle-mounted antenna capable of being mounted on a roof of a vehicle. For example, the base board 110 is designed to be adaptive for the roof of the vehicle, and thus the multi-band low profile antenna 100 can be mounted on the roof of the vehicle. Further, the base board 110 is designed to have an opening 112 for the main cable 150. The main cable 150 has a first part 151 passing through the opening 112 and a second part 152 extending against a top surface of the base board 110, thereby transmitting the signals of the first antenna circuit 131, the second antenna circuit 132 and the third antenna circuit 133 to or from an external device on the vehicle.

The circuit board 120 is vertically disposed on the top surface of the base board 110, and the second part 152 of the main cable 150 is electrically connected to a bottom region of the circuit board 120. The base board 110 has ground planes 114 for optimization of the Voltage Standing Wave Ratio (VSWR) of the multi-band low profile antenna 100. In this embodiment, the ground planes 114 are disposed corresponding to the opposite sides of the circuit board 120.

As shown in FIG. 2, the antenna circuit 131 (hereinafter, referred to as "first antenna circuit 131") is disposed on a top-left region of the circuit board 120, the antenna circuit 132 (hereinafter, referred to as "second antenna circuit 132") is disposed on a right region of the circuit board 120, and the third antenna circuit 133 (hereinafter, referred to as "third antenna circuit 133") is disposed between the first antenna circuit 131 and the second antenna circuit 132. Further, an opening 124 is formed between the first antenna circuit 131 and the third antenna circuit 133, and the opening 124 is disposed on the opening 112 of the base board 110 (see FIG. 1).

The first antenna circuit 131 provides a communication corresponding to a first frequency band, the second antenna circuit 132 provides a communication corresponding to a second frequency band, and the third antenna circuit 133 provides a communication corresponding to a third frequency band. The first frequency band of the first antenna circuit 131 is the VHF band. The second frequency band of the second antenna circuit 132 is the frequency band from 700 MHz to 800 MHZ. The third frequency band of the third antenna circuit 133 is the UHF band.

As shown in FIG. 2 and FIG. 3, the first antenna circuit 131, the second antenna circuit 132 and the third antenna circuit 133 are electrically connected though the connection cable 140. The connection cable 140 is configured to allow the signals of the first antenna circuit 131, the second antenna circuit 132 and the third antenna circuit 133 to be transmitted. The connection cable 140 is optimized so that currents flow up the connection cable 140. Therefore, the length of the connection cable 140 is controlled in accordance with the first frequency band of the first antenna circuit 131, the second band of the second antenna circuit 132 and the third frequency band of the third antenna circuit 133 for optimization of power/gain. In some embodiments, the length of the connection cable 140 is in a range from 4.4752 inches to 40.2767 inches for optimization with respect to 455 MHz, but embodiments of the present invention are not limited thereto. In some embodiments, the length of the connection cable 140 is in a range from 2.4021 inches to 22.6246 inches for optimization with respect to 810 MHz.

Figure 4:
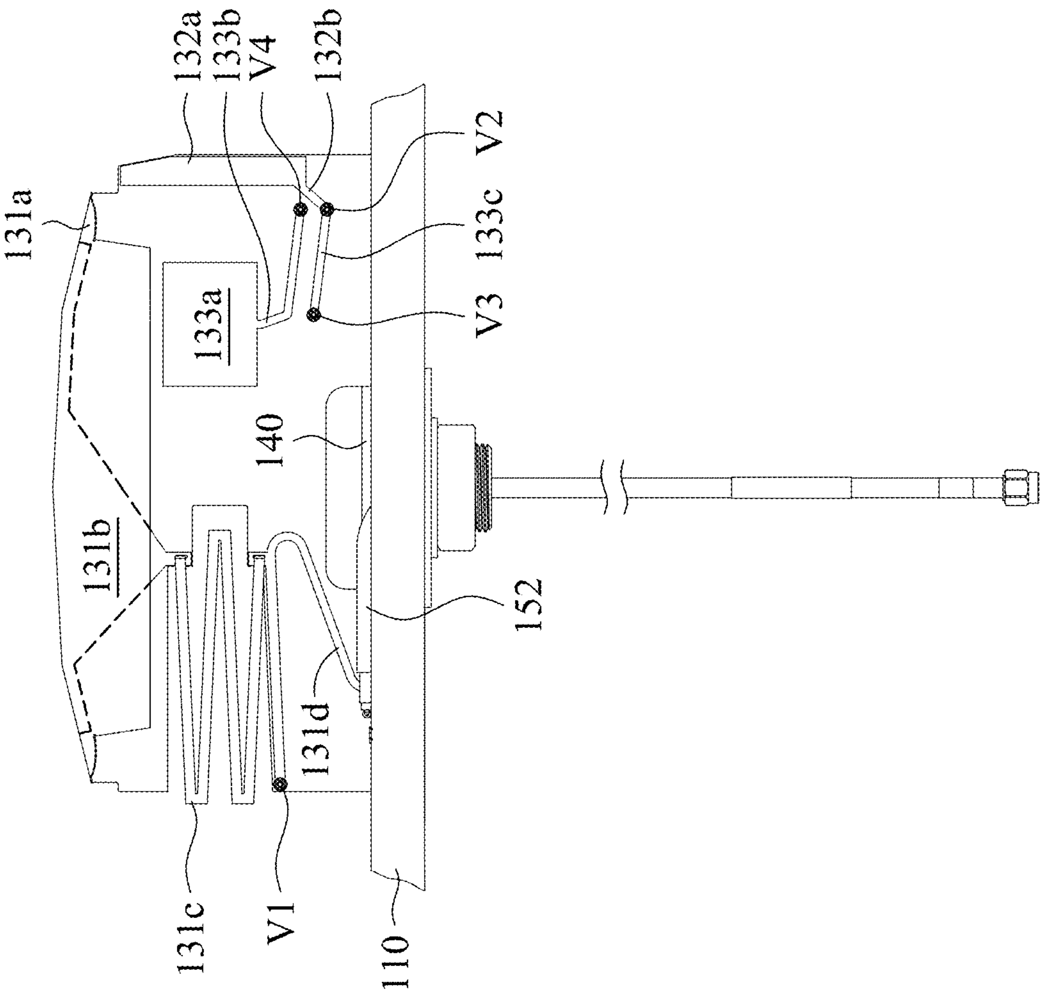

The first antenna circuit 131 includes the top loading element 131*a*, a first radiator 131*b*, a metal element 131*c*, and circuit traces 131*d*-131*e*. The circuit trace 131*e* is electrically connected to a connection point CP1 which is electrically connected to the connection cable 140. In this embodiment, the circuit trace 131*e* is provided for center loading. The circuit trace 131*d* is disposed at a first side of the circuit board 120, the circuit trace 131*e* is disposed at a second side of the circuit board 120, and an via (plated through hole) V1 passing through the circuit board 120 is disposed between the circuit trace 131*d* and the circuit trace 131*e* to allow electric connection between the circuit trace 131*d* and the circuit trace 131*e*. The metal element 131*c* is disposed in an opening 125 of the circuit board 120 and electrically connected between the circuit trace 131*d* and the first radiator 131*b*. In this embodiment, the metal element 131*c* is designed to have a W shape for high working power (for example, 100 watts). The first radiator 131*b* is electrically connected between the top loading element 131*a* and the metal element 131*c*. As shown in FIG. 4, the first radiator 131*b* has a taper portion, and the taper portion has a narrow area close to the metal element 131*c* and a wider area close to the top loading element 131*a*. The top loading element 131*a* is disposed on the top of the circuit board 120, and has two bent portions extends along the circuit board 120.

The second antenna circuit 132 includes a second radiator 132*a* and circuit traces 132*b*-132*c*. The circuit trace 132*c* is electrically connected to a connection point CP2 which is electrically connected to the connection cable 140. In this embodiment, the circuit trace 132*b* is disposed at the first side of the circuit board 120, the circuit trace 132*c* is disposed at the second side of the circuit board 120, and an via V2 passing through the circuit board 120 is disposed between the circuit trace 132*b* and the circuit trace 132*c* to allow electric connection between the circuit trace 132*b* and the circuit trace 132*c*. The second radiator 132*a* is electrically connected to the circuit trace 132*b*, thereby transmitting signals from/to the connection cable 140. In this embodiment, the second radiator 132*a* is disposed at an edge of the circuit board 120. Specifically, the second radiator 132*a* and the above metal element 131*c* are disposed at opposite edges of the circuit board 120.

The third antenna circuit 133 includes a third radiator 133*a* and circuit traces 133*b*-133*e*. The circuit trace 133*c* is electrically connected to the via V2 for electric connection to the connection cable 140. The circuit trace 133*d* is electrically connected to the circuit trace 133*c*. In this embodiment, the circuit trace 133*c* is disposed at the first side of the circuit board 120, the circuit trace 133*d* is disposed at the second side of the circuit board 120, and an via V3 passing through the circuit board 120 is disposed between the circuit trace 133*c* and the circuit trace 133*d* to allow electric connection between the circuit trace 133*c* and the circuit trace 133*d*. The circuit trace 133*b* is electrically connected between the circuit trace 133*d* and the third radiator 133*a*. In this embodiment, the circuit trace 133*b* is disposed at the first side of the circuit board 120, and an via V4 passing through the circuit board 120 is disposed between the circuit trace 133*d* and the circuit trace 133*b* to allow electric connection between the circuit trace 133*b* and the circuit trace 133*d*. Further, the circuit trace 133*e* is provided for center loading and electrically connected to the circuit trace 133*d*.

In this embodiment, the third radiator 133*a* is disposed between the first radiator 131*b* and the second radiator 132*a*, and the first radiator 131*b*, the second radiator 132*a* and the third radiator 133*a* are disposed at the same side (i.e., the second side) of the circuit board 120.

The connection cable 140 is electrically connected to the connection point CP1 and the connection point CP2. Specifically, a first terminal 141 of the connection cable 140 is electrically connected to the first antenna circuit 131, and a second terminal 142 of the connection cable 140 is electrically connected to the second antenna circuit 132 and the third antenna circuit 133. The connection cable 140 is a coaxial cable having a conductor 143 and a ground layer covering the conductor 143. The conductor 143 of the first terminal 141 is electrically connected to the connection point CP1 to be electrically connected to the first antenna circuit 131. The conductor 143 of the second terminal 142 is electrically connected to the connection point CP2 to be electrically connected to the second antenna circuit 132 and the third antenna circuit 133.

Further, the connection cable 140 is electrically connected to the main cable 150 at the connection point CP1. Specifically, the connection cable 150 is a coaxial cable having a conductor 152*a* and a ground layer covering the conductor 152*a*. The conductor 152*a* of the second part 152 of the main cable 150 passes through the circuit board 120 from the first side of the circuit board 120 to the second side of the circuit board 120, and touches the connection point CP1. Therefore, the connection cable 140 is electrically connected to the main cable 150 at the connection point CP1, and the signals of the first antenna circuit 131, the second antenna circuit 132 and the third antenna circuit 133 can be transmitted to or from an external device through the connection cable 140 and the main cable 150.

Further, in some embodiments, the base board 110 has though holes for protrusions of the circuit board 120. The sizes of the though holes base board 110 matches up the sizes of the protrusions of the circuit board 120, and thus the ground plane of the circuit board 120 can be connected to the ground plane if the base board 110 after the protrusions of the circuit board 120 insert into the though holes of the base board 110. Solders are alternatively used to help the connection of the protrusions of the circuit board 120 and the though holes of the base board 110.

In some embodiments, the circuit trace 131*d* is electrically connected to the ground plane of the circuit board 120/the base board 110.

Figure 5:
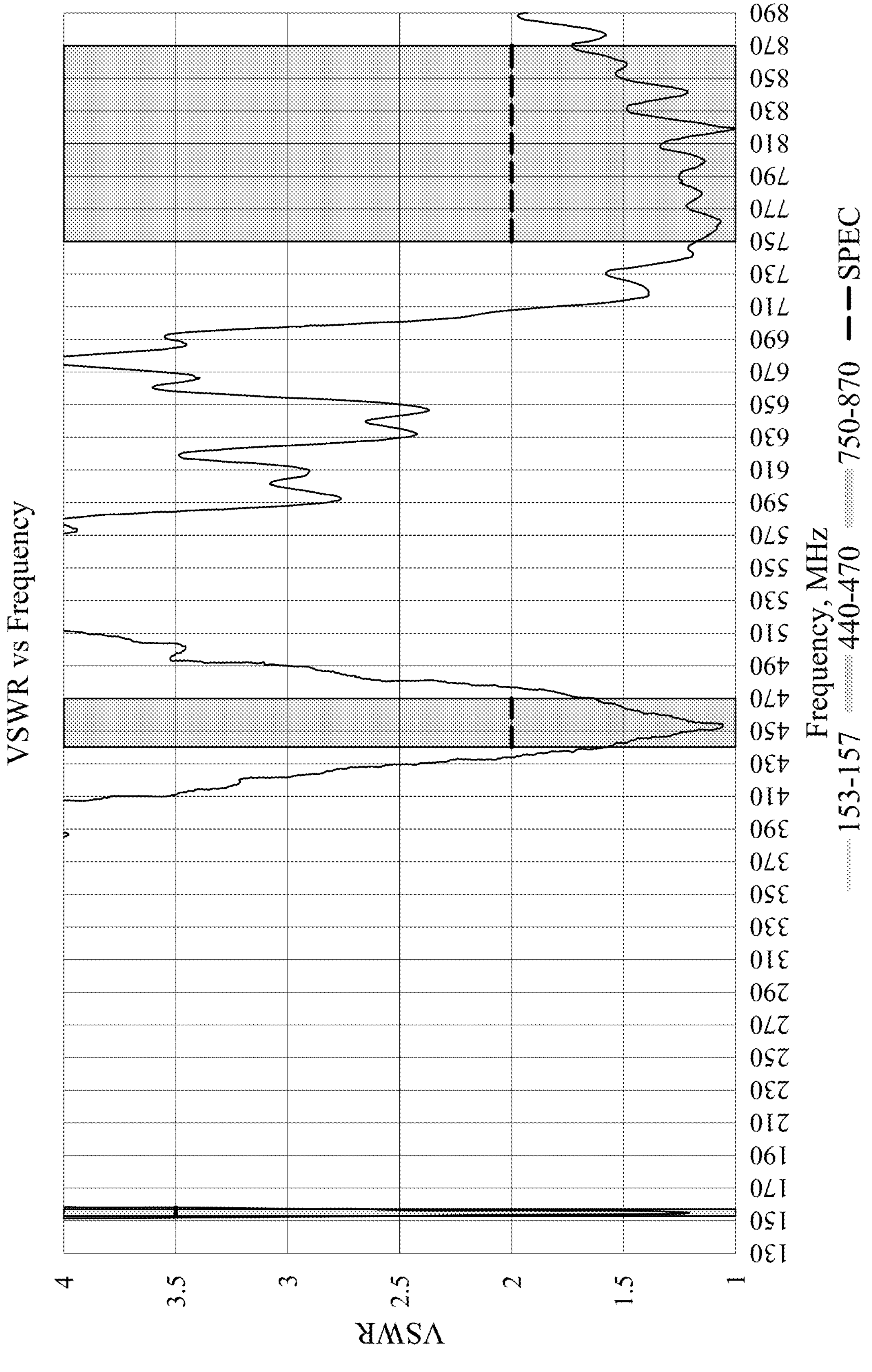
FIG. 5 is a schematic diagram showing the VSWR of the multi-band low profile antenna.

Referring to FIG. 5, FIG. 5 is a schematic diagram showing the VSWR of the multi-band low profile antenna 100. As shown in FIG. 5, good VSWR is presented for the frequency bands 153-157 MHz, 440-470 MHz, and 750-870 MHz. Specifically, the VSWR of the frequency bands 153-157 MHz, 440-470 MHz, and 750-870 MHz meets the requirement of specification (i.e., 2, represented by the dotted line).

The multi-band low profile antenna 100 of the embodiments of the present invention integrates antenna circuits 131-133 of three different frequency bands, in which one connection cable 140 is used for the integration to allow currents flow up the connection cable 140 for optimization of power/gain thereby achieving small-sized high-performance antenna.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A multi-band low profile antenna, comprising:
a base board;
a circuit board vertically disposed on a top surface of the base board;
a first antenna circuit disposed on the circuit board, wherein the first antenna circuit is configured to provide a first communication function of a first frequency band;
a second antenna circuit disposed on the circuit board, wherein the second antenna circuit is configured to provide a second communication function of a second frequency band;
a third antenna circuit disposed on the circuit board, wherein the third antenna circuit is configured to provide a third communication function of a third frequency band;
a connection cable disposed between the first antenna circuit and the second antenna circuit, wherein the connection cable has a first terminal electrically connected to the first antenna circuit, and has a second terminal electrically connected to the second antenna circuit and the third antenna circuit, thereby transmitting signals of the first antenna circuit, the second antenna circuit and the third antenna circuit; and
a main cable electrically connected to the first terminal of the connection cable to transmit the signals of the first antenna circuit, the second antenna circuit and the third antenna circuit to or from an external device;
wherein a length of the connection cable is controlled in accordance with the first frequency band, the second band and the third frequency band;
wherein the first antenna circuit comprises a first radiator disposed on a top of the circuit board, the second antenna circuit has a second radiator disposed at a first edge of the circuit board, and the third antenna circuit has a third radiator disposed between the first radiator and the second radiator.

2. The multi-band low profile antenna of claim 1, wherein the first frequency band of the first antenna circuit corresponds to a Very High Frequency (VHF) band, the second frequency band of the second antenna circuit corresponds to a frequency band from 700 MHz to 800 MHZ, and the third frequency band of the third antenna circuit corresponds to an Ultra-High Frequency (UHF) band.

3. The multi-band low profile antenna of claim 1, wherein the circuit board has a first side and a second side opposite to the first side, a part of the main cable is disposed at the first side of the circuit board, and the connection cable is disposed at the second side of the circuit board.

4. The multi-band low profile antenna of claim 3, wherein the first terminal of the connection cable is electrically connected to a first connection point to be electrically connected to the first antenna circuit at the second side of the circuit board, and the part of the main cable passes through the circuit board to be electrically connected to the first connection point at the second side of the circuit board for electric connection to the connection cable.

5. The multi-band low profile antenna of claim 4, wherein the second terminal of the connection cable is electrically connected to a second connection point at the second side of the circuit board for electric connection to the second antenna circuit.

6. The multi-band low profile antenna of claim 1, wherein the first antenna circuit further comprises a top loading element disposed on the top of the circuit board.

7. The multi-band low profile antenna of claim 6, wherein the circuit board has an opening at a second edge opposite to the first edge, and the first antenna circuit further comprises a metal element disposed in the opening of the circuit board.

8. The multi-band low profile antenna of claim 1, wherein the base board has a ground plane for optimization of a Voltage Standing Wave Ratio (VSWR) of the multi-band low profile antenna.

9. The multi-band low profile antenna of claim 1, wherein the main cable and the connection cable are coaxial cables.

10. A vehicle-mounted antenna, comprising:
a base board;
a circuit board vertically disposed on a top surface of the base board;
a first antenna circuit disposed on the circuit board, wherein the first antenna circuit is designed for a first frequency band;
a second antenna circuit disposed on the circuit board, wherein the second antenna circuit is designed for a second frequency band;
a third antenna circuit disposed on the circuit board, wherein the third antenna circuit is designed for a third frequency band;
a connection cable disposed between the first antenna circuit and the second antenna circuit, wherein the connection cable has a first terminal electrically connected to the first antenna circuit, and has a second terminal electrically connected to the second antenna circuit and the third antenna circuit, thereby transmitting signals of the first antenna circuit, the second antenna circuit and the third antenna circuit; and
a main cable electrically connected to the first terminal of the connection cable to transmit signals of the first antenna circuit, the second antenna circuit and the third antenna circuit to or from an external device;

wherein a length of the connection cable is controlled in accordance with the first frequency band, the second band and the third frequency band;

wherein the base board has an opening, the main cable has a first part passing through the opening of the base board, and a second part extending against a top surface of the base board, and the base board is adaptive for a roof of a vehicle;

wherein the first antenna circuit comprises a first radiator disposed on a top of the circuit board, the second antenna circuit has a second radiator disposed at a first edge of the circuit board, and the third antenna circuit has a third radiator disposed between the first radiator and the second radiator.

11. The vehicle-mounted antenna of claim 10, wherein the first frequency band of the first antenna circuit corresponds to a VHF band, the second frequency band of the second antenna circuit corresponds to a frequency band from 700 MHz to 800 MHZ, and the third frequency band of the third antenna circuit corresponds to an UHF band.

12. The vehicle-mounted antenna of claim 10, wherein the circuit board has a first side and a second side opposite to the first side, the second part of the main cable is disposed at the first side of the circuit board, and the connection cable is disposed at the second side of the circuit board.

13. The vehicle-mounted antenna of claim 12, wherein the first terminal of the connection cable is electrically connected to a first connection point to be electrically connected to the first antenna circuit at the second side of the circuit board, and the second part of the main cable passes through the circuit board to be electrically connected to the first connection point at the second side of the circuit board for electric connection to the connection cable.

14. The vehicle-mounted antenna of claim 13, wherein the second terminal of the connection cable is electrically connected to a second connection point at the second side of the circuit board for electric connection to the second antenna circuit.

15. The vehicle-mounted antenna of claim 10, wherein the first antenna circuit further comprises a top loading element disposed on the top of the circuit board.

16. The vehicle-mounted antenna of claim 15, wherein the circuit board has an opening at a second edge opposite to the first edge, and the first antenna circuit further comprises a metal element disposed in the opening of the circuit board.

17. The vehicle-mounted antenna of claim 10, wherein the base board has a ground plane for optimization of VSWR of the multi-band low profile antenna.

18. The vehicle-mounted antenna of claim 10, wherein the main cable and the connection cable are coaxial cables.

* * * * *